United States Patent
Zhang et al.

(10) Patent No.: US 11,921,701 B2
(45) Date of Patent: Mar. 5, 2024

(54) GLOBAL DISTRIBUTED TRANSACTIONS ACROSS MICROSERVICES

(71) Applicant: eBay Inc., San Jose, CA (US)

(72) Inventors: Guogen Zhang, San Jose, CA (US); Kun Ren, San Jose, CA (US); Sami Ben-Romdhane, Los Altos, CA (US)

(73) Assignee: eBay Inc., San Jose, CA (US)

( * ) Notice: Subject to any disclaimer, the term of this patent is extended or adjusted under 35 U.S.C. 154(b) by 609 days.

(21) Appl. No.: 16/400,364

(22) Filed: May 1, 2019

(65) Prior Publication Data

US 2020/0257676 A1 Aug. 13, 2020

Related U.S. Application Data

(60) Provisional application No. 62/804,319, filed on Feb. 12, 2019.

(51) Int. Cl.
| | |
|---|---|
| *G06F 16/23* | (2019.01) |
| *G06F 9/46* | (2006.01) |
| *G06F 12/0804* | (2016.01) |
| *G06F 12/0866* | (2016.01) |
| *G06F 12/128* | (2016.01) |

(52) U.S. Cl.
CPC ...... *G06F 16/2379* (2019.01); *G06F 12/0804* (2013.01); *G06F 16/2365* (2019.01); *G06F 2212/1008* (2013.01)

(58) Field of Classification Search
None
See application file for complete search history.

(56) References Cited

U.S. PATENT DOCUMENTS

| | | | |
|---|---|---|---|
| 7,206,805 B1* | 4/2007 | McLaughlin, Jr. | ..... G06F 9/466 707/999.01 |
| 8,682,842 B2* | 3/2014 | Reed | ................... G06F 11/1471 707/674 |
| 9,305,047 B2 | 4/2016 | Little | |
| 9,990,391 B1* | 6/2018 | Cole | ................... G06F 16/2365 |

(Continued)

FOREIGN PATENT DOCUMENTS

WO  2020/167417 A1  8/2020

OTHER PUBLICATIONS

What is FaunaDB?, Retrieved from the Internet URL: <https://app.fauna.com/documentation/intro/faunadb>, Accessed on Aug. 19, 2020, 5 pages.
International Search Report Received for PCT Patent Application No. PCT/US2020/014325, dated Apr. 30, 2020, 5 pages.
Written Opiniont received for PCT Application No. PCT/US2020/014325, dated Apr. 30, 2020, 15 Pages.

(Continued)

*Primary Examiner* — Neveen Abel Jalil
*Assistant Examiner* — John J Morris
(74) *Attorney, Agent, or Firm* — FIG. 1 Patents

(57) ABSTRACT

A global transaction system receives a transaction request for a plurality of database services of microservices. The global transaction system receives a plurality of local commit decisions of local commit requests from local transaction managers of the database services of the microservices. The local commit request corresponds to the transaction request for each database. The global transaction system generates a physical commit request to each of the local transaction managers based on the local commit decisions and a global commit decision. Each local transaction manager submits the physical commit request to each database server of the database services corresponding to the transaction request.

20 Claims, 15 Drawing Sheets

(56) References Cited

U.S. PATENT DOCUMENTS

| | | | | |
|---|---|---|---|---|
| 10,025,845 | B1* | 7/2018 | Holenstein | G06F 16/2365 |
| 2004/0215473 | A1* | 10/2004 | Bhogi | G06Q 20/102 |
| | | | | 705/40 |
| 2005/0187891 | A1* | 8/2005 | Johnson | G06F 11/202 |
| 2006/0149791 | A1 | 7/2006 | Sinha et al. | |
| 2012/0166407 | A1* | 6/2012 | Lee | G06F 9/466 |
| | | | | 707/703 |
| 2015/0378774 | A1* | 12/2015 | Vermeulen | G06F 9/466 |
| | | | | 707/703 |
| 2016/0179876 | A1* | 6/2016 | Jimenez Peris | H04L 67/01 |
| | | | | 707/703 |
| 2017/0011085 | A1* | 1/2017 | Douros | G06F 16/27 |
| 2017/0177698 | A1* | 6/2017 | Lee | G06F 16/2315 |
| 2017/0374161 | A1* | 12/2017 | Chrysanthakopoulos | |
| | | | | G06F 16/245 |

OTHER PUBLICATIONS

International Preliminary Report on Patentability Received for PCT Patent Application No. PCT/US2020/014325, dated Aug. 26, 2021, 15 Pages.

Thomson et al., "Calvin: Fast Distributed Transactions for Partitioned Database Systems", SIGMOD '12: Proceedings of the 2012 ACM SIGMOD International Conference on Management of Data, May 20-24, 2012, 12 Pages.

20707911.2 , "Communication under Rule 71(3)", EP Application No. 20707911.2, dated Mar. 21, 2023, 9 pages.

202080008955.5, "Foreign Office Action", CN Application No. 202080008955.5, dated Sep. 22, 2023, 10 pages.

23184353.3, "Extended European Search Report", EP Application No. 23184353.3, dated Sep. 18, 2023, 14 pages.

\* cited by examiner

GLOBAL DISTRIBUTED TRANSACTIONS ACROSS MICROSERVICES

RELATED APPLICATION

The present application claims priority from U.S. Provisional Patent Application Ser. No. 62/804,319 filed Feb. 12, 2019, entitled "GLOBAL DISTRIBUTED TRANSACTIONS ACROSS MICROSERVICES", which is incorporated herein by reference in its entirety.

BACKGROUND

Technical Field

The subject matter disclosed herein generally relates to a special-purpose machine that includes a system for consistent distributed transactions across microservices, including computerized variants of such special-purpose machines and improvements to such variants, and to the technologies by which such special-purpose machines become improved compared to other special-purpose machines.

Microservice architecture is used in large scale cloud data platforms and application development. Microservice architecture provides flexibility for application development and reuse of fine-grained services. Microservices can be developed by different domain teams to support business applications. They may be implemented in various languages, such as Java or Golang, and access multiple underlying databases. Applications in microservices architecture usually require invocation of multiple microservices, which access multiple databases. When an application invokes multiple microservices, the application relies on distributed transactions to perform consistent updates to the underlying databases.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
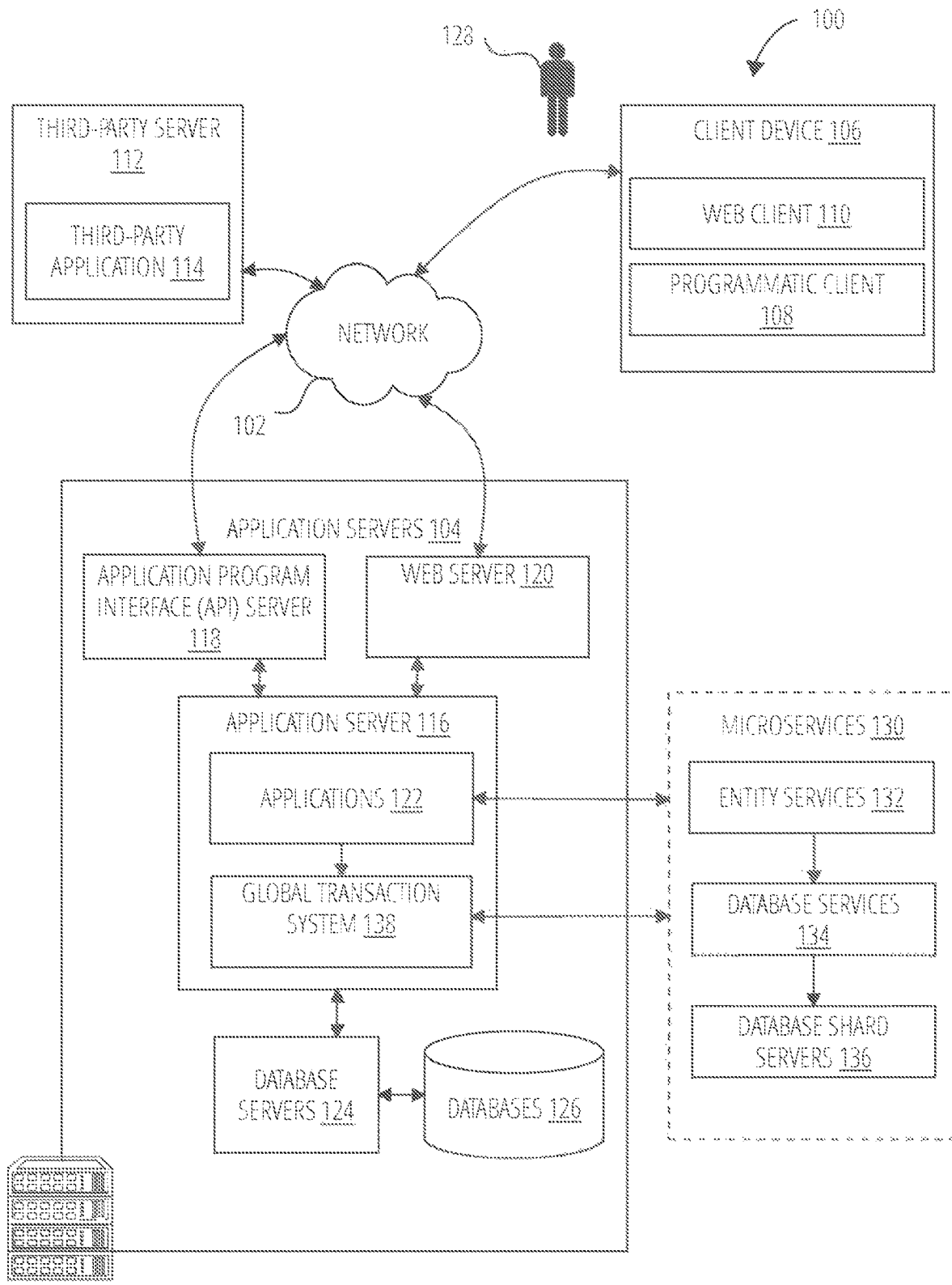
FIG. 1 is a diagrammatic representation of a networked environment in which the present disclosure may be deployed, in accordance with some example embodiments.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine, A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a novel system that supports consistent distributed transactions across microservices that are implemented in various languages and use multiple underlying databases. The system is efficient and scalable and provides serializability for transactions across multiple databases exposed through microservices.

The traditional technique is to use two-phase commit (2PC) protocol to achieve distributed transactions. Unfortunately, 2PC does not work well in large-scale high-throughput systems, for applications that have certain amount of transaction conflicts. One reason is the locks are held during the entire 2PC process that significantly increase the transaction conflicts and latency. Other methods include persistent message queue pattern for loosely coupled distributed transactions. However, such persistent message queue pattern requires some framework and application logic to compensate failed transaction steps or even business policies to remediate through business measures, costing business money and impacting user experiences. Other systems can achieve distributed transactions on a single database. However, these systems cannot be applied to cross multiple microservices.

The present application describes a global transaction system that coordinates transactions and processes for a distributed transaction across multiples databases. Microservice architecture for applications brings new challenges for consistent distributed transactions across multiple microservices that use multiple underlying databases to achieve their functionality. These microservices may be implemented in different languages, and access multiple underlying databases. The present application describes a system that resolves this challenge by using deterministic technologies and optimistic concurrency control protocol (OCC). The read set and write set of a transaction is captured at each of the relevant database service points during the optimistic execution phase, and at the commit time, conflict checking is performed at each database level, and global commit decision is achieved by coordinating the involved databases. Logically committed transactions (write-sets) are persisted in logs first and then asynchronously applied to the physical databases deterministically. The present system is able to achieve consistent, high throughput and serializable distributed transactions for any applications invoking microservices.

In one example embodiment, a global transaction system receives a transaction request for a database service of a microservice. The global transaction system also receives a local commit decision of a local commit request from a local transaction manager of the database service of the microservice. The local commit request corresponds to the transaction request. The global transaction system generates a physical commit request to the local transaction manager based on the local commit decisions and a global commit decision. The local transaction manager submits the physical commit request to a database server of the database service corresponding to the transaction request.

As a result, one or more of the methodologies described herein facilitate solving the technical problem of latency and throughput with conventional methods such as two-phase commit. As such, one or more of the methodologies described herein may obviate a need for certain efforts or computing resources that otherwise would be involved in blocking transactions. For example, locks are held during an entire 2PC process that significantly increase the transaction conflicts and latency. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 110. A web client 110 (e.g., a browser) and a programmatic client 108 (e.g., an "app") are hosted and execute on the web client 110.

An Application Program Interface (API) server 118 and a web server 120 provide respective programmatic and web interfaces to application servers 104. A specific application server 116 hosts applications 122 and a global transaction system 138, which includes components, modules and/or applications.

The applications 122 may provide a number of functions and services to users who access the application servers 104. For example, the applications 122 may include a publication application that enables users to publish content (e.g., product item information) on a hosted web page. While the applications 122 is shown in FIG. 1 to be part of the application servers 104, it will be appreciated that, in alternative embodiments, the applications 122 may be separate and distinct from the application server 116.

The global transaction system 138 coordinates requests from the applications 122 to access services provided by microservices 130. For example, the global transaction system 138 coordinates transactions requests from the applications 122 across distributed database servers of the microservices 130. In one example embodiment, the microservices 130 includes entity services 132, database services 134, and database shard servers 136.

Further, while the network environment 100 shown in FIG. 1 employs a client-server architecture, the embodiments are, of course, not limited to such an architecture, and could equally well find application in a distributed, or peer-to-peer, architecture system, for example. The applications 122 could also be implemented as a standalone software program, which do not necessarily have networking capabilities.

The web client 110 accesses the applications 122 via the web interface supported by the web server 120. Similarly, the programmatic client 108 accesses the various services and functions provided by the applications 122 via the programmatic interface provided by the Application Program Interface (API) server 118. In one example, the programmatic client 108 may, for example, be a seller application (e.g., eBay Application developed by eBay Inc., of San Jose, California) to enable sellers to author and manage listings on the network environment 100 in an offline manner, and to perform batch-mode communications between the programmatic client 108 and the application servers 104.

FIG. 1 also illustrates a third-party application 114 executing on a third-party server 112 as having programmatic access to the application servers 104 via the programmatic interface provided by the Application Program Interface (API) server 118. For example, the third-party application 114 may, utilizing information retrieved from the application server 116, support one or more features or functions on a website hosted by a third party. The third-party website may, for example, provide one or more promotional, marketplace, or payment functions that are supported by the relevant applications of the application servers 104.

Any of the systems or machines (e.g., databases, devices, servers) shown in, or associated with, FIG. 1 may be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
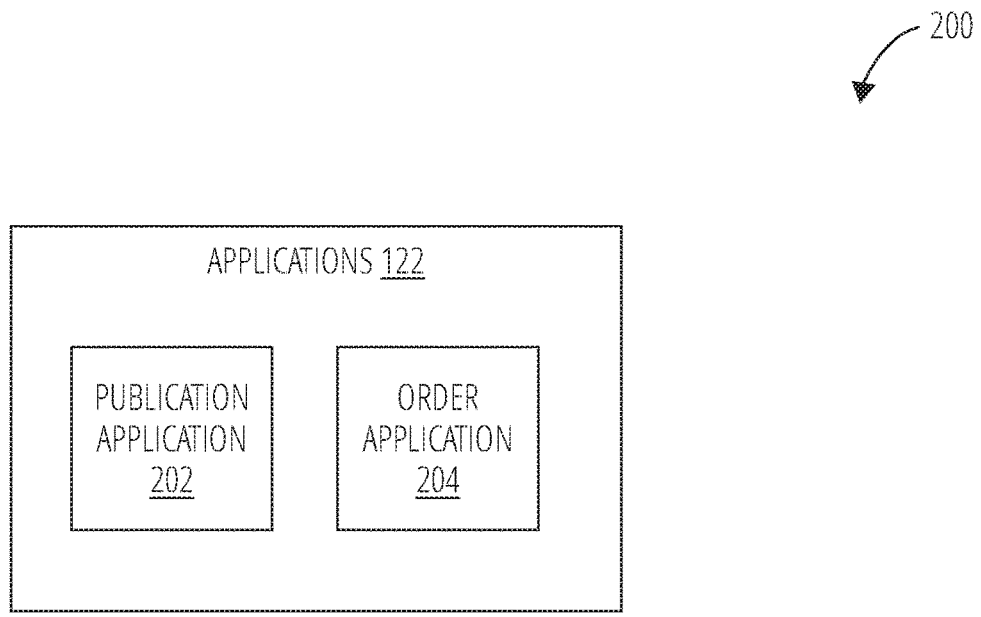
FIG. 2 is a block diagram illustrating examples of applications that, in one example embodiment, is provided as part of a networked system.

FIG. 2 is a block diagram illustrating the applications 122 that, in one example embodiment, are provided as part of the network environment 100. The applications 122 may be hosted on dedicated or shared server machines (not shown) that are communicatively coupled to enable communications between or among server machines. The applications 122 themselves are communicatively coupled (e.g., via appropriate interfaces) to each other and to various data sources, to allow information to be passed between or among the applications 122 or to allow the applications 122 to share and access common data. The applications 122 may furthermore access one or more databases 126 via the database servers 124.

The application server 116 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the applications 122 is shown to include at least one publication application 202 and one or more order application 204.

Figure 3:
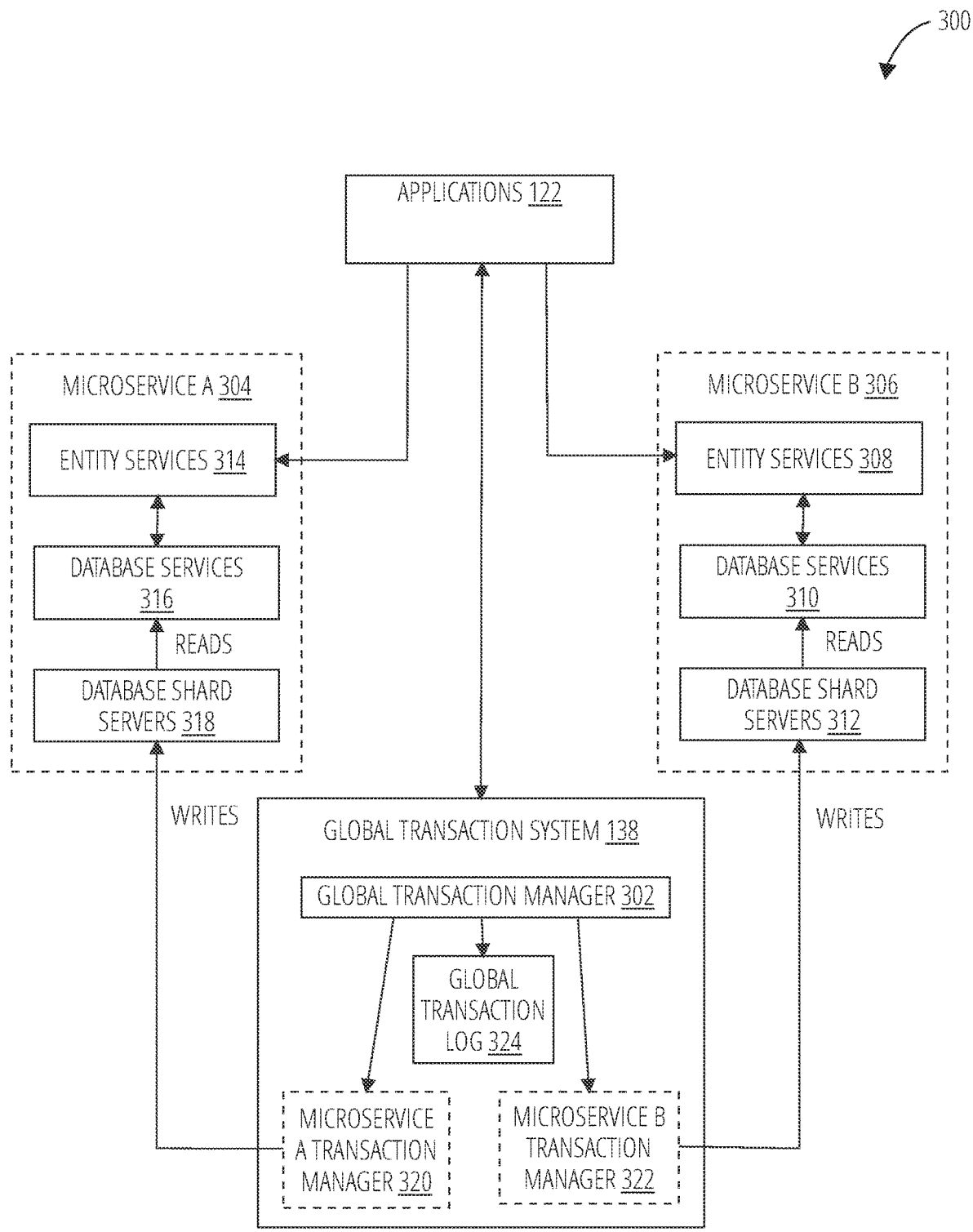
FIG. 3 is a block diagram illustrating an example of an architecture for distributed transactions, in accordance with one example embodiment.

FIG. 3 is a block diagram illustrating an example of an architecture 300 for distributed transactions, in accordance with one example embodiment. The architecture 300 comprises applications 122, a global transaction system 138, a microservice A 304, and a microservice B 306. The global transaction system 138 includes a global transaction manager 302, a global transaction log 324, a microservice A transaction manager 320, and a microservice B transaction manager 322. The microservice B 306 includes entity services 308, a database services 310, a database shard servers 312. The microservice A 304 includes entity services 314, a database services 316, a database shard servers 318.

FIG. 3 illustrates an architecture of a horizontal scale-out database service (e.g., database services 316, database services 310), and microservices (e.g., microservice A 304, microservice B 306) for applications 122. The entire data set is partitioned (e.g., sharded) into non-overlapping shards (e.g., database shard servers 318, database shard servers 312). Each shard is embodied in a replica set of identical replicas, spreading over multiple physical machines in data centers, supported by a replication protocol, such as multi-Paxos or Raft, or by playing identical logs, for high availability and read throughput.

The DB servers (e.g., database services 316, database services 310) include a key-value store model. DB services (e.g., database services 316, database services 310) provide transparency of partitioning and operational impacts (such as split of a shard) to the clients. The DB services also provide services at data object level, such as table rows, or JSON documents encoded as values. Entity services (e.g., entity services 314, database services 310), microservices for the applications 122, provide business entity interface to applications 122 with abstraction and mapping from business entities to data objects. An application from applications 122 invokes multiple microservices to achieve the business functions using functionality of the microservices (e.g., microservice A 304, microservice B 306). The microservices invoke underlying DB services (e.g., database services 316, database services 310).

Every database access goes through one of the DB service instances (e.g., database services 316, database services 310). For correctness of serializability, all reads and writes go through the DB service without implicit reads hidden inside DB servers that would be part of the read-set for a transaction. Transactions can be supported within each DB shard server.

The global transaction system 138 coordinates transactions across multiple databases (e.g., database shard servers 318, database shard servers 312) from microservices e.g., microservice A 304 and microservice B 306). In one example embodiment, the global transaction system 138 includes the global transaction manager 302, the global transaction log 324.

The global transaction manager 302 (GTM) receives transaction requests and coordinates global transactions across multiple databases. In another example embodiment, the global transaction system 138 includes multiple GTMs.

The global transaction log 324 (GTL) represents the transaction request queue for the global transaction manager 302. The order in the global transaction log 324 determines the relative serializability order among global transactions. Persistence of the GTL is optional.

The global transaction system 138 includes the microservice A transaction manager 320 and the microservice B transaction manager 322. Each microservice transaction manager (for each database services) performs a conflict checking and resolution. For example, local commit decisions are performed at the DB transaction manager level.

The entity services 314 provide business-oriented service for applications to implement business logic. Each DB may have support for multiple microservices and each microservice is independent to each other. The database services 316 (DB Service) provides DB Engine Read/Write interface and directly access DB Servers (e.g., database shard servers 318). The database services 316 also caches the Read/Write results of each transaction during the execution phase and sends them to its local transaction manager for conflict resolution at commit time. The database shard servers 318 include deterministic database engines. Each server uses deterministic concurrency control protocol to materialize logically committed transactions concurrently.

Figure 4:
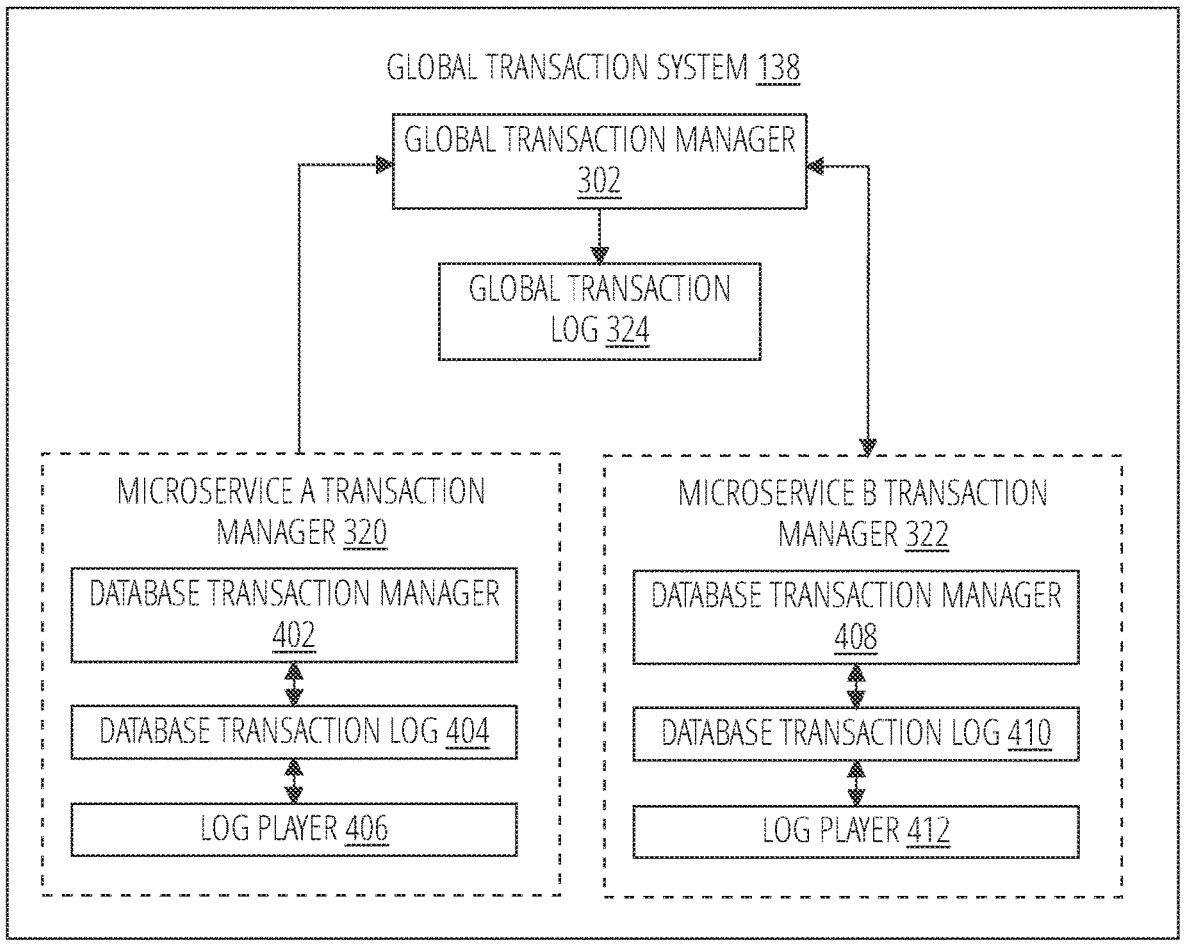
FIG. 4 is a block diagram illustrating a global transaction system that, in one example embodiment, is provided as part of a networked system.

FIG. 4 is a block diagram illustrating a global transaction system that, in one example embodiment, is provided as part of a networked system. The global transaction system 138 comprises a global transaction manager 302, a microservice A transaction manager 320, a microservice B transaction manager 322, and a global transaction log 324. The microservice A transaction manager 320 includes a database transaction manager 402, a database transaction log 404, a log player 406. The microservice B transaction manager 322 includes a database transaction manager 408, a database transaction log 410, and a log player 412.

Each microservice transaction manager (e.g., microservice A transaction manager 320, microservice B transaction manager 322) includes a local database transaction manager DBTM (e.g., database transaction manager 402, database transaction manager 408). The DBTM at each database level performs conflict checking and resolution (e.g., local commit decision is located here).

The database transaction log (DBTL) (e.g., database transaction log 404, database transaction log 410), at each database level, logs logically committed transactions that relate to its corresponding database (including single database transactions and multi-database transactions). The transaction order in a DBTL determines the serializability order of the whole database system, and global transactions from GTLs are reflected here.

In one example, database transaction manager 402 persists its transaction commit data into the database transaction log 404, strictly based on the order of transaction commit, for logically committed transactions. The log player 406 tails the database transaction log 404 log store and sends relevant W-sets to the corresponding DB shard servers to deterministically apply to the DB shards. The log player 406 provides feedback to the database transaction log 404 and database transaction manager 402 its latest physically committed DBTL LSN. This information is useful for the conflict checking and maintenance of local cache of database transaction manager 402.

Figure 5:
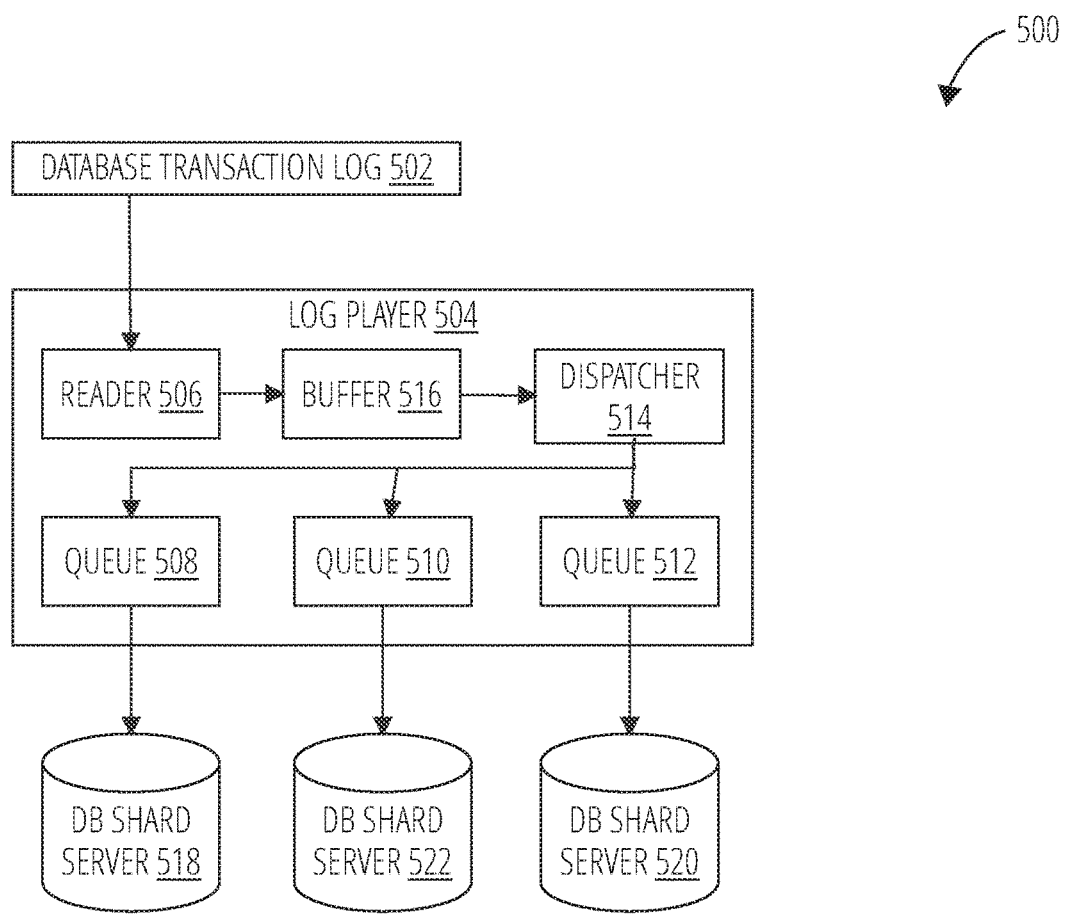
FIG. 5 is a block diagram illustrating an example of a database transaction log and a log player in accordance with one embodiment.

FIG. 5 illustrates an architecture of using a log store (e.g., database transaction log 502) for distributed transactions across shards using the deterministic approach. The log player 504 reads data from database transaction log 502. Each log store entry contains the W-set for a committed transaction to be physically materialized to the DB shard servers (e.g., DB shard server 518, DB shard server 522, DB shard server 520).

In one example embodiment, the log player 504 includes a reader 506, a buffer 516, and a dispatcher 514. The reader 506, buffer 516, and dispatcher 514 read data from database transaction log 502, analyzes a W-set, and divides it up into multiple W-sets based on the partitioning scheme. The dispatcher 514 sends them to the corresponding DB shard servers (e.g., DB shard server 518, DB shard server 520, DB shard server 522). The queues (e.g., queue 508, queue 510, queue 512) batches multiple w-sets from multiple log entries for better performance. Within each shard server, the shard server applies the W-sets received from the log player 504 in order, without the need to coordinate with other servers. There is no need for a replication protocol among identical replicas for a shard server.

Figure 6:
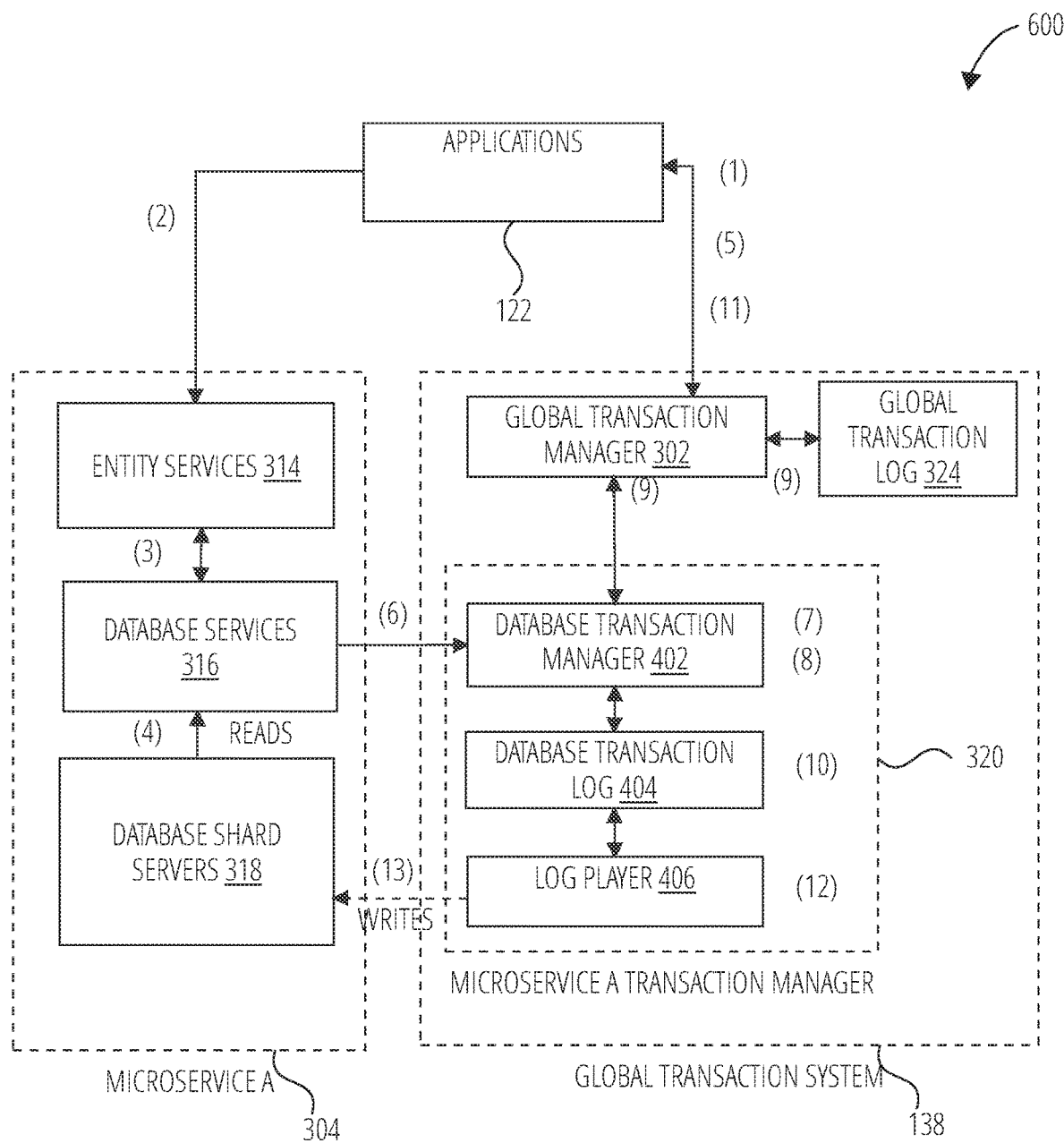
FIG. 6 is a block diagram illustrating an example operation of a global transaction system, in accordance with one example embodiment.

FIG. 6 is a block diagram illustrating an example operation of a global transaction system, in accordance with one example embodiment. In step (1), the applications 122 start a global transaction by requesting a transaction ID (TXID) from the global transaction manager 302. In step (2), the applications 122 invokes entity services 314 (of microservice A 304) carrying the TXID. At step (3), the entity services 314 invokes database services 316 carrying the TXID. At step (4), the database services 316 captures (read-set, write-set) for the TXID. At step (5), the applications 122 requests the global transaction manager 302 to commit for TXID. At step (6), the database services 316 sends a commit request for TXID with (read-set, write-set) to database transaction manager 402. At step (7), database transaction manager 402 orders the commit request and checks conflict for the TXID. At step (8), the database transaction manager 402 sends a local commit decision to global transaction manager 302 for TXID. At step (9), the global transaction manager 302 sends a global commit decision to all DBTMs for TXID after collecting all DBTMs decision. At step (10), the database transaction manager 402 receives the commit decision from the global transaction manager 302 and persists w-set for TXID in database transaction log 404. The database transaction manager 402 also puts w-set with LSN in the w-cache for conflict checking. The database transaction manager 402 responds back to the global transaction manager 302. At step (11), the global transaction manager 302 sends a commit success to the applications 122.

The three phases of a transaction processing are described as follows:

The optimistic execution phase: steps 1-4. A transaction fetches and updates databases through microservices (e.g., microservice A 304) and database services (e.g., database services 316). The fetches and updates are captured by each database service as (r-set, w-set). In one example embodiment, the version info (i.e. Log Sequence Number—LSN) for each data item in the r-set for conflict resolution is captured.

The logical commit phase: steps 5-13. At commit time, commit decision is made by transaction managers (e.g., database transaction manager 402, global transaction manager 302). If there is a conflict, the transaction is aborted. Otherwise, the transaction is committed logically and put into transaction logs (steps 6-11).

The physical materialization phase: databases (e.g., database shard servers 318) materialize the transactions from the logs (database transaction log 404) and make physical commit to the databases (steps 12-13).

In one example embodiment, the logical commit decision is accomplished at two levels as described below:

At a DB level (e.g., microservice A 304): on receiving a commit request, the DB service agent (e.g., database services 316) submits the request with its local (r-set, w-set) and meta information for the transaction TXID to the DBTM (e.g., database transaction manager 402). The DBTM performs conflict checking based on its w-set cache of recently committed transactions. The logic of checking conflict is similar to that in the traditional OCC except that the DBTM does not access DB to figure out the conflicts but uses a cache of past transaction updates. If there is no conflict, the transaction request can be locally committed. And if the transaction only involves a single database, then the transactions w-set will be put into the DBTL log (e.g., database transaction log 404) with an LSN assigned. The transaction is then logically committed. If the transaction involves multiple databases, the DBTM (e.g., database transaction manager 402) sends its local commit decision to the GTM (e.g., global transaction manager 302) for TXID, and acts based on response from the GTM. If there is a conflict during conflict checking, or the global commit decision from the GTM is abort, the transaction is aborted.

At the global level: the GTM (e.g., global transaction manager 302) coordinates a commit request of a transaction involving multiple databases. The GTM, on receiving commit request for a transaction TXID, waits for the involved DBTMs' (e.g., database transaction manager 402) commit decisions. If all the commit decisions from the DBTMs are Commit, the transaction can be committed. If any DBTM reports Abort, the transaction is aborted. The GTM informs the DBTMs of the global commit decision by responding to their submissions. This interaction is simpler than a 2PC protocol and without locking in the databases. For commit materialization phase, the deterministic database engines are leveraged to achieve that. Under normal conditions, transactions are deterministically executed following the transaction order in the DBTL (e.g., database transaction log 404). Under abnormal conditions when the updates cannot be performed (because of hardware errors, or software crash), recovery is performed with deterministic recovery algorithm, by replaying log entries to a snapshot of the DB shard.

Figure 7:
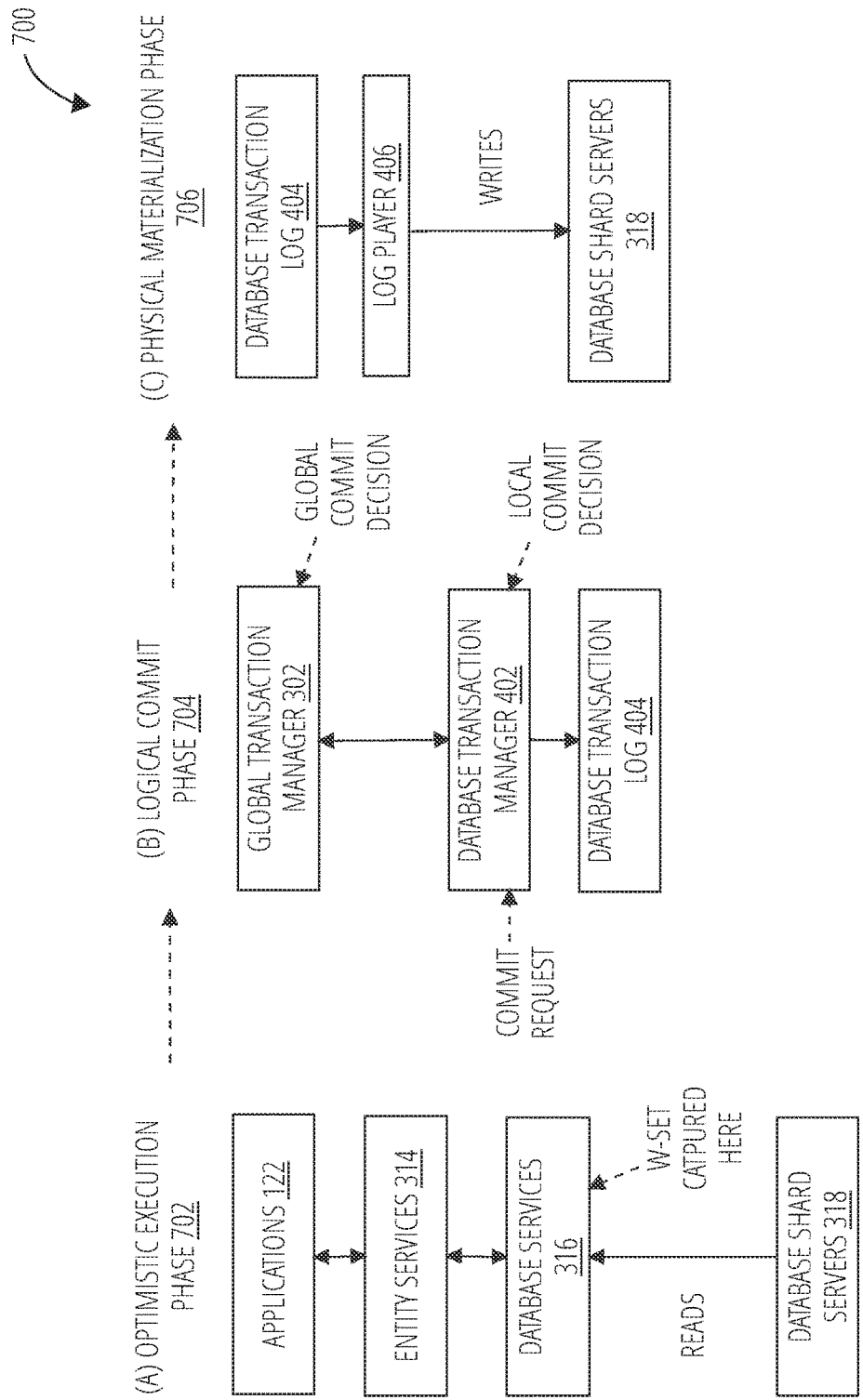
FIG. 7 illustrates examples of phases of the global transaction system in accordance with one embodiment.

FIG. 7 illustrates examples of phases of the global transaction system in accordance with one embodiment.

The consistency of distributed transactions is guaranteed through three phases: (A) optimistic execution phase 702, (B) logical commit phase 704, and (C) physical materialization phase 706. In the (A) optimistic execution phase 702, the applications 122 submits a transaction request to the entity services 314 to update database services 316. In one example, (A) optimistic execution phase 702, the transaction fetches and updates databases through microservices (e.g., entity services 314) and database services (e.g., database services 316), and the fetches and updates are captured by each database service instance (e.g., database shard servers 318) as (r-set, w-set). In another example, the (A) optimistic execution phase 702 captures the version info (i.e. Log Sequence Number—LSN) for each data item in the r-set for conflict resolution.

In the (B) logical commit phase 704, the global transaction manager 302 performs conflict resolution and coordination at a global level. The database transaction manager 402 performs conflict resolution and coordination at each database level. Once a transaction is committed, the transaction is first put in the commit logs (e.g., database transaction log 404).

In the (C) physical materialization phase 706, the log player 406 reads the database transaction log 404 and materialized the commit transaction by applying the writes to the databases (e.g., database shard servers 318).

Figure 8:
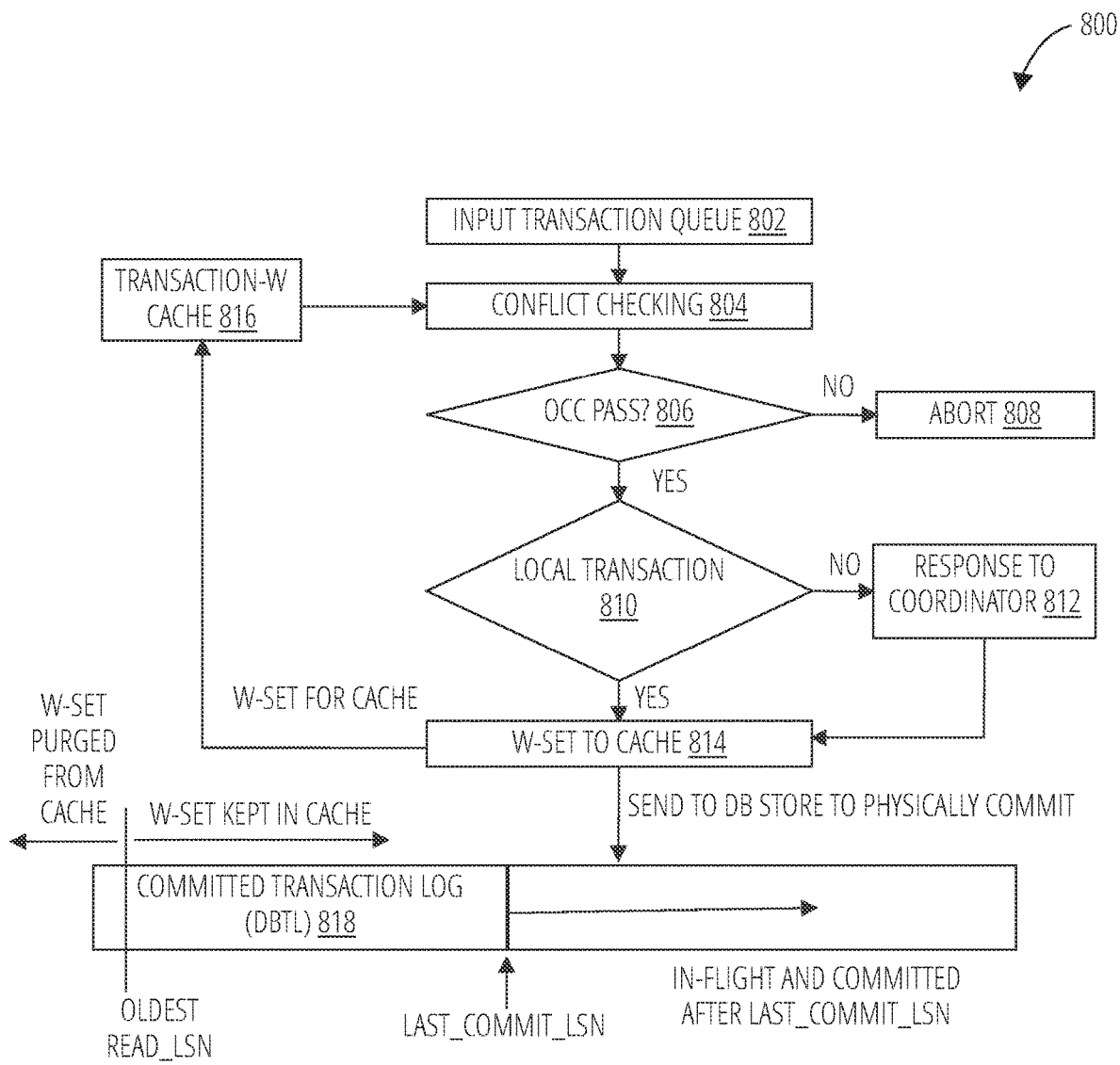
FIG. 8 illustrates a flow diagram illustrating an example operation of the global transaction system in accordance with one embodiment.

FIG. 8 illustrates a flow diagram illustrating an example operation of the global transaction system in accordance with one embodiment. One of the functionalities of the DBTM (e.g., database transaction manager 402, database transaction manager 408) is to check conflict among transaction commit requests. Unlike traditional OCC, DBTM performs the conflict checking based on its local cache for efficiency.

At block 802, the transaction request is received from an input transaction queue. At block 804, the DBTM performs a conflict check on the transaction request. At decision block 806, DBTM determines whether the transaction request using OCC. The DBTM aborts the transaction requests at block 808 in response to failing the OCC test of decision block 806. The DBTM then determines whether the transaction request is a local transaction at decision block 810. For non-local transaction requests, the DBTM provides a response to the coordinator (e.g., (global transaction manager 302) at block 812. For local transaction requests or committing global transaction requests, the DBTM generates a w-set to the local cache (e.g., transaction-w cache 816). After conflict checking, the DBTM sends to the commit request to the DB store to physical commit via block 818.

The following illustrates notations that may be used to describe the algorithm of FIG. 8:

DB: {(key, value, lsn)}
Input Queue: [Tranx]
DBTL: [<LSN, Tranx, CommitState>] TranxState: ID-> (State, Commit_LSN)
State: In_Flight, Logically_Committed, Physically_Committed, Aborted
CommitState: Logically_Committed, Physically_Committed
InFlight={ID|TranxState(ID)=In_Flight}
LogicallyCommitted={ID|TranxState(ID)= Logically_Committed}
PhysicallyCommitted={ID|TranxState(ID)= Physically_Committed}

Tranx: (ID, R-Set, W-Set, Read_LSN, Commit_LSN), where Commit_LSN is only meaningful after the transaction is committed.

R-Set: {(key, value, lsn)} W-Set: {(key, value, lsn)}

Tranx-W Cache: U <W-Set+LSN> for all transactions belonging to LogicallyCommitted For conflict checking, only key and lsn are used so values do not have to be kept in transaction data for r-sets, and in Tranx-W cache for w-sets.

The following illustrates an example of an algorithm for ConflictChecking(Tranx):

Input: Tranx (ID, R-Set, W-Set, Read_LSN)
Output: Commit decision (COMMIT/ABORT)
Algorithm:
For each entry(key, _, lsn) in R-Set do e1(key1, _, lsn1)=find_in_cache(key); If not found then continue; else if lsn1>lsn then return ABORT;
return COMMIT;
End;

This description of the algorithm is sequential for the input transaction queue as it assumes there are no pending commit requests outside those committed and whose W-sets are already in the Tranx-W cache. This ignores the performance when the DBTM needs to work with a global transaction manager. Between conflict checking and successful writing to the commit log, there may be pending transactions whose w-sets are not in the cache. Logically these transactions can be in a queue and included in these w-sets for checking.

For a global transaction, due to the waiting for the global commit decision, the DBTM would block the commit requests behind the input queue. One of the enhancements to the above algorithm is to have a lock manager to deal with checking with pending transactions. Those without conflict can go ahead to commit, and those with conflict need to wait behind the conflicting transaction.

The following illustrates additional notations for cache purge logic:

Last_Commit_LSN: for lsn<=Last_Commit_LSN, LOG (lsn) contains transactions whose state is all Physically_Committed Last_Commit_LSN=max {Commit_LSN|for lsn<Commit_LSN, LOG(lsn) contains a tranx whose TranxState=Physically_Committed}

Read_LSN=Last_Commit_LSN at the beginning of Tranx (or first read).

Oldest_Read_LSN: there exists a transaction ID, whose TranxState(ID)=In_Flight, and its Read_LSN>=Oldest_Read_LSN (=min {Read_LSN (ID)|ID in InFlight})

Tranx-W Cache purge: A cached w-set entry is only useful if there is a potential transaction that will conflict with it. The goal of conflict checking is to see if there is any other transaction that has changed an entry since the transaction read it. A transaction reads from DB servers directly in OCC execution phase, which include all the commits from transactions up to Last_Commit_LSN and maybe more. A transaction only needs to check those w-set entries cached after its Read_LSN (e.g., using the Oldest_Read_LSN). Once Oldest_Read_LSN moves, cache entries with LSN<Oldest_Read_LSN can be removed.

Figure 9:
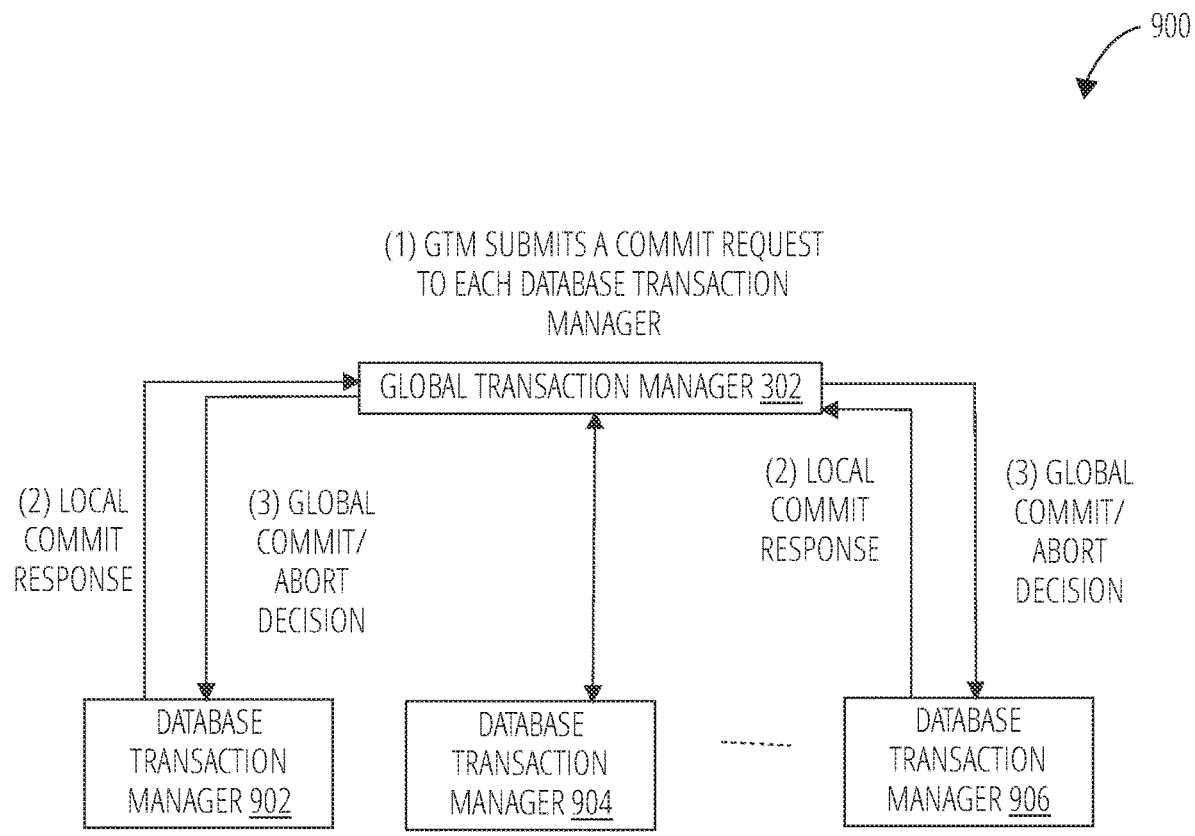
FIG. 9 is a block diagram illustrating another example operation of a global transaction system, in accordance with one example embodiment.

FIG. 9 is a block diagram illustrating another example operation of a global transaction system, in accordance with one example embodiment. A transaction may involve data across multiple DBs. Each database service is covered by a corresponding local DBTM (e.g., database transaction manager 902, database transaction manager 904, database transaction manager 906). The global transaction manager 302 coordinates among multiple DBTMs involved during the transaction commit phase. For example, in step (1), the global transaction manager 302 submits a commit request to each local database transaction manager. In step (2), each local database transaction manager provides a response (e.g., local commit response) based on local conflict check using a local cache. In step (3), the global transaction manager 302 provides a global commit decision based on the local commit responses from all local database transaction managers.

Traditional 2PC does not perform well if the participants take time to acquire resources and perform real commit during the process. Here the conflict checking and commit process is a short-duration because the commit process is divided into logical commit and physical commit. This coordination process only needs to get through logical commit.

The following illustrates an example algorithm illustrating the operation of the FIG. 9:

Algorithm: commit_coordinate
Input: tranx(ID, {DBTMi})
Output: global commit decision(commit/abort) Algorithm:
commit=true;
For dbtm in {DBTMi} do
commit=commit &&
(dbtm.ConflictChecking(tranx)==COMMIT);
For dbtm in {DBTMi} do
dbtm.send(tranx, commit ? COMMIT: ABORT);
Return commit;
End;

In another example embodiment, the request messages can be reduced by waiting for DBTMs' local commit decisions on GTM side. This reduces the commit coordination to one round-trip. Another problem with 2PC is dealing with failure. Timeout can be used to detect failures to avoid blocking of the flow.

Figure 10:
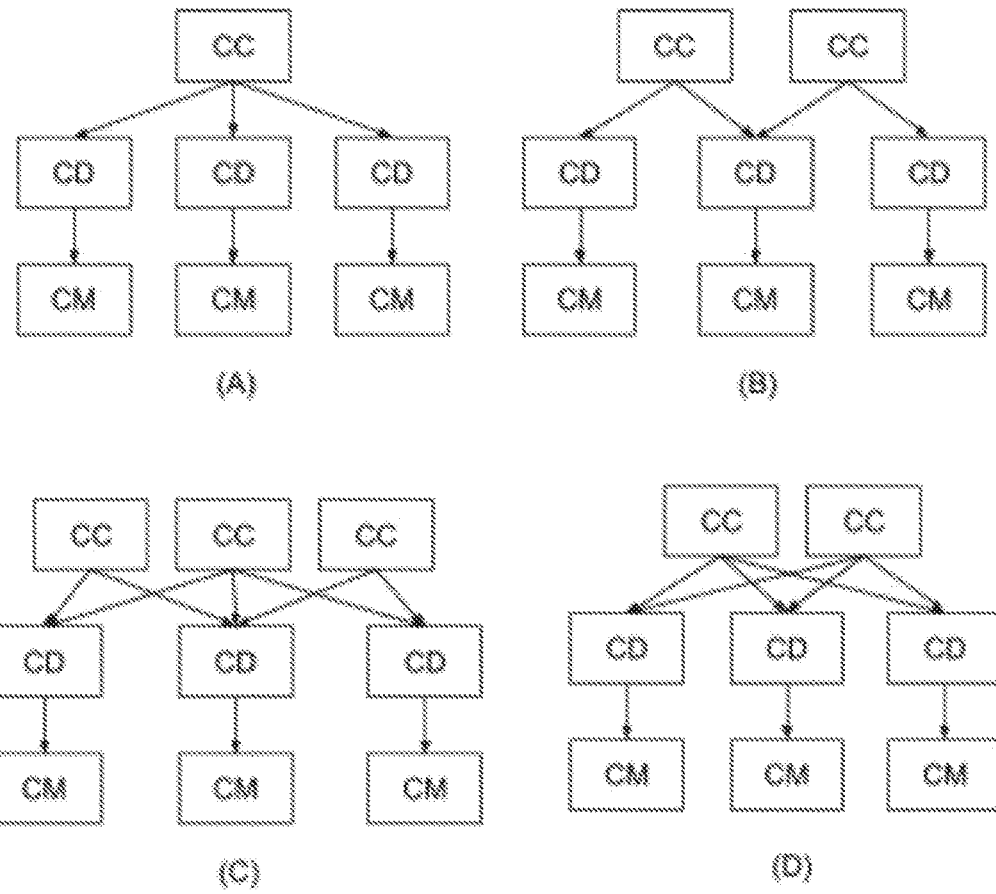
FIG. 10 illustrates an example of scalability of the global n system in accordance with one embodiment.

FIG. 10 illustrates an example of scalability of the global transaction system in accordance with one embodiment. The short-hand notations are as follows: CC stands for Commit Coordination, which is a GTM instance; CD stands for Commit Decision, which is a DBTM/DBTL instance pair; and CM is Commit Materialization, which is log players and corresponding DB shard servers. The diagrams in FIG. 10 illustrate the possible deployment patterns:

(A) has one CC that coordinates between three CDs.
(B) has two CCs that coordinate three CDs, each CC coordinates between two CDs. One (the middle) CD takes commit requests from both CCs.
(C) adds one (the middle) CC to (B), which handles transactions involving three DBs, each covered by one CD.
(D) is to divide the traffic of the top CC in (A) into two CCs to support more traffic. Or it is a deployment for transactions across three DBs with two CCs.

Figure 11:
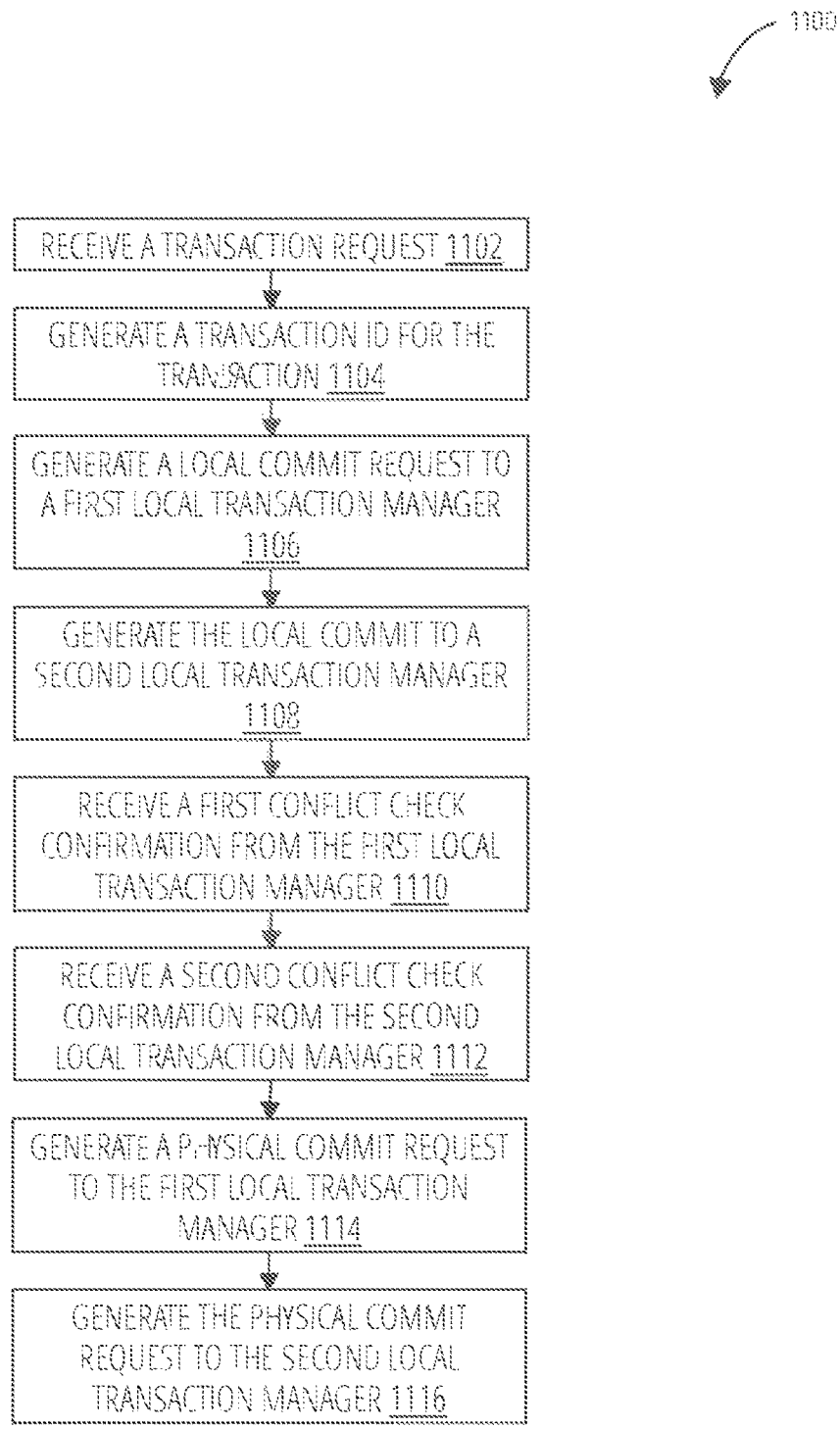
FIG. 11 illustrates a flow diagram illustrating a method for operating the global transaction system in accordance with one embodiment.

FIG. 11 is a flow diagram illustrating a method 1100 for consistent distributed transactions across microservices with multiple database, in accordance with an example embodiment. Operations in the method 1100 may be performed by the global transaction system 138, using components (e.g., modules, engines) described above with respect to FIG. 4. Accordingly, the method 1100 is described by way of example with reference to the global transaction system 138. However, it shall be appreciated that at least some of the operations of the method 1100 may be deployed on various other hardware configurations or be performed by similar components residing elsewhere. For example, some of the operations may be performed at the third-party server 112.

At block 1102, the global transaction system 138, the global transaction manager 302 receives a transaction request (e.g., from applications 122). At block 1104, the global transaction manager 302 generates a transaction id for the transaction request. At block 1106, the global transaction manager 302 generates a local commit request to a first local transaction manager (e.g., microservice A transaction manager 320). At block 1108, the global transaction manager 302 generates a local commit request to a second local transaction manager (e.g., microservice B transaction manager 322). At block 1110, the global transaction manager 302 receives a first conflict check confirmation from the first local transaction manager. At block 1112, the global transaction manager 302 receives a second conflict check confirmation from the second local transaction manager. Once the global transaction manager 302 determines that there is no conflict based on the first and second conflict check, at block 1114, the global transaction manager 302 generates a physical commit request to the first local transaction manager. At block 1116, the global transaction manager 302 generates a physical commit request to the second local transaction manager.

Figure 12:
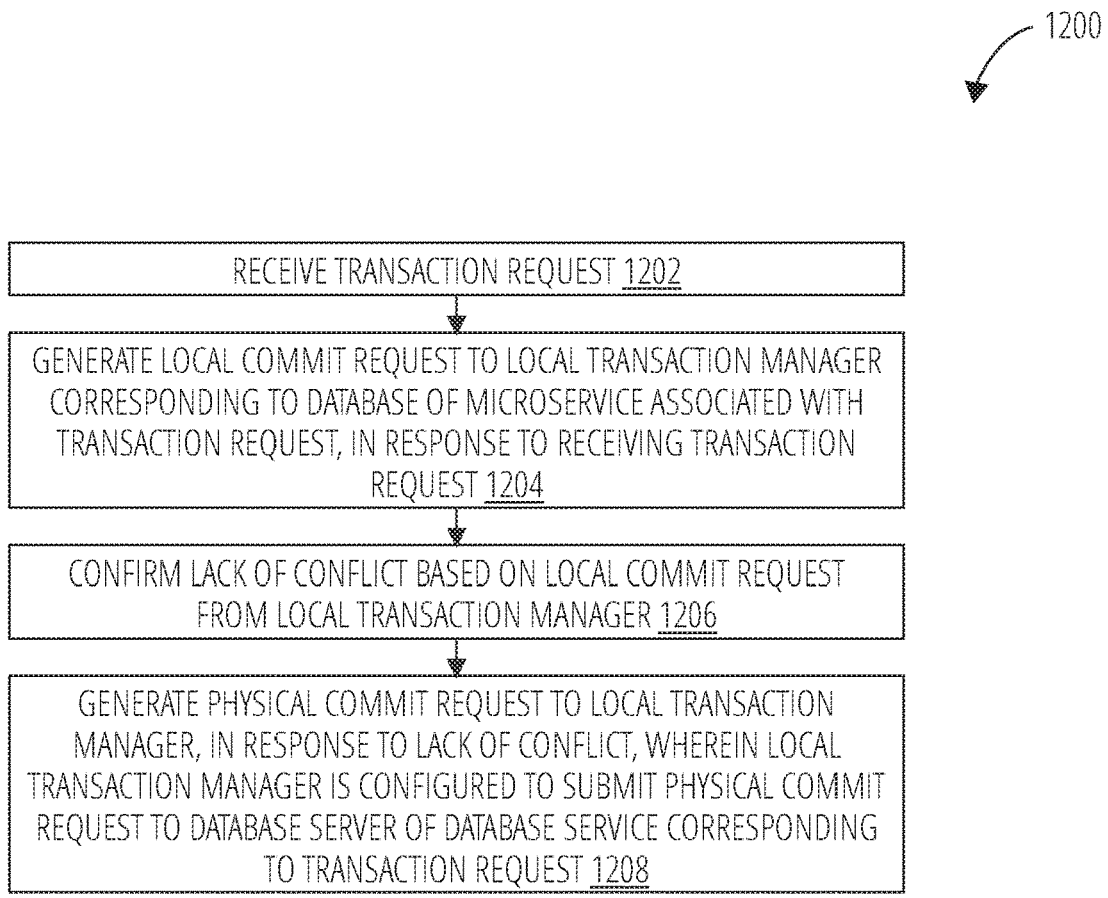
FIG. 12 illustrates a flow diagram illustrating a method for operating the global transaction system in accordance with one embodiment.

FIG. 12 is a flow diagram illustrating a routine 1200 for consistent distributed transactions across microservices with multiple databases, in accordance with an example embodiment. Operations in the routine 1200 may be performed by the global transaction system 138, using components (e.g., modules, engines) described above with respect to FIG. 4. Accordingly, the routine 1200 is described by way of example with reference to the global transaction system 138. However, it shall be appreciated that at least some of the operations of the routine 1200 may be deployed on various other hardware configurations or be performed by similar components residing elsewhere. For example, some of the operations may be performed at the third-party server 112.

In block 1202, routine 1200 receives a transaction request. In block 1204, routine 1200 generates a local commit request to a local transaction manager corresponding to a database of a microservice associated with the transaction request, in response to receiving the transaction request. In block 1206, routine 1200 confirms a lack of conflict based on the local commit request from the local transaction manager. In block 1208, routine 1200 generates a physical commit request to the local transaction manager, in response to the lack of conflict, wherein the local transaction manager is configured to submit the physical commit request to a database server of a database service corresponding to the transaction request.

Figure 13:
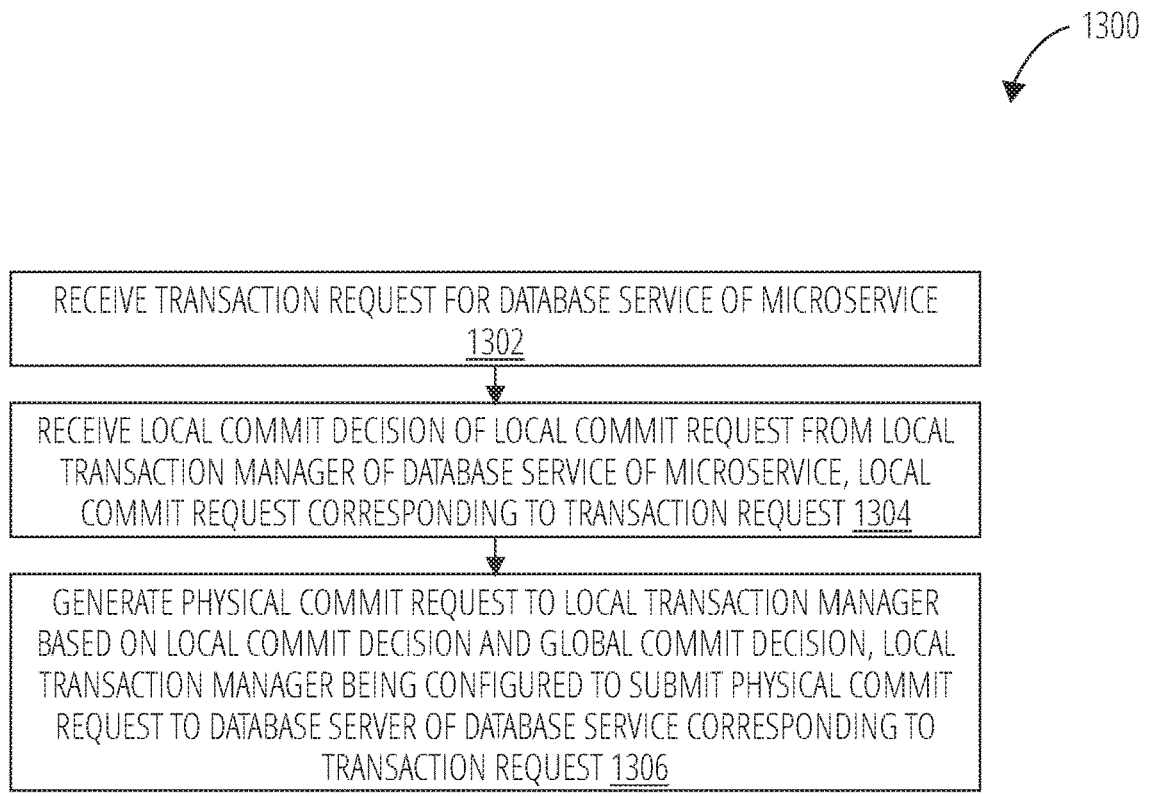
FIG. 13 illustrates a routine in accordance with one embodiment.

FIG. 13 is a flow diagram illustrating a routine 1300 for operating a global transaction manager coordination across microservices with multiple database, in accordance with an example embodiment. Operations in the routine 1300 may be performed by the global transaction system 138, using components (e.g., modules, engines) described above with respect to FIG. 4. Accordingly, the routine 1300 is described by way of example with reference to the global transaction system 138. However, it shall be appreciated that at least some of the operations of the routine 1300 may be deployed on various other hardware configurations or be performed by similar components residing elsewhere. For example, some of the operations may be performed at the third-party server 112.

In block 1302, routine 1300 receives a transaction request for a database service of a microservice. In block 1304, routine 1300 receives a local commit decision of a local commit request from a local transaction manager of the database service of the microservice, the local commit request corresponding to the transaction request. In block 1306, routine 1300 generates a physical commit request to the local transaction manager based on the local commit decision and a global commit decision, the local transaction manager being configured to submit the physical commit request to a database server of the database service corresponding to the transaction request.

Figure 14:
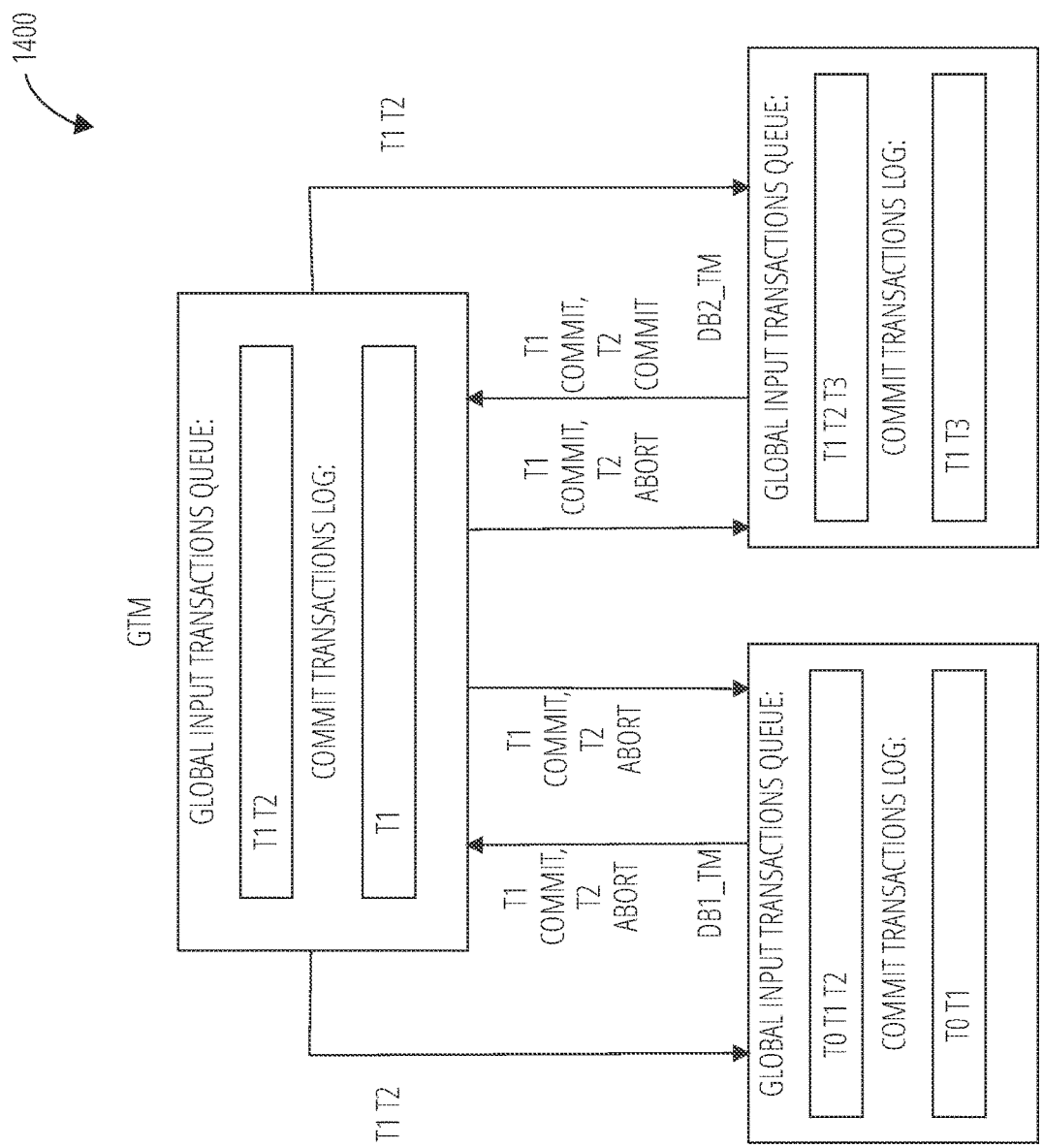
FIG. 14 illustrates an example of a transaction execution for multiple databases in accordance with one embodiment.

FIG. 14 illustrates an example of a transaction execution for multiple databases in accordance with one embodiment. This figure shows an example of transactions execution process of cross DB transactions. We ignore the detail of single DB transactions execution detail since we already described it in the previous figure. T1 and T2 are global distributed transactions (cross DB transactions) which update records in both DB1 and DB2. T0 is a local transaction to DB1 only, and T3 is a local transaction to DB2 only. Only cross DB transactions need to go through GTM (Global transactions manager), local transactions only need to go through its local DB_TM, so in this example, T1 and T2 are sent to GTM and pushed into GTM's transactions input queue for ordering after the OCC execution phase (Note that OCC execution phase was executed in each DB_TM), T0 is sent to DB1_TM and pushed into DB1_TM's transactions input queue, T3 is sent to DB2_TM and pushed into DB2_TM's transactions input queue.

The execution process is described below:
(1) GTM will periodically send the decomposed transactions in order from its transactions input queue to the involved DBs. In this example GTM sends T1 T2 to DB1_TM and DB2_TM which will put them into their own transactions input queue.
(2) DB1_TM and DB2_TM will do the OCC verification and conflict resolution on T1/T2's local read/write set.
(3) DB1_TM and DB2_TM will send their own commit/abort decision to GTM, in this example, in DB1 side, T1 can be committed, and T2 will be aborted; In DB2 side, both T1 and T2 can be committed.
(4) When GTM receives all decisions from involved DB_TMs, it can make the final decision on the cross-DB transactions. In this example, T1 can be committed since both DB1 and DB2 agree to commit, but T2 will be aborted since DB1 will abort the transaction. GTM will persist the committed transactions by putting them into the commit transactions log. Then GTM sends the decisions to all the involved DB_TMs.
(5) When DB_TM receives the final decisions on the cross-DB transactions, DB_TM can commit transactions by putting them into its own commit transactions log. The commit transactions log in GTM and all DB_TMs determine the global serializable order. The transactions serializable order in this example is T0->T1->T3.

Figure 15:
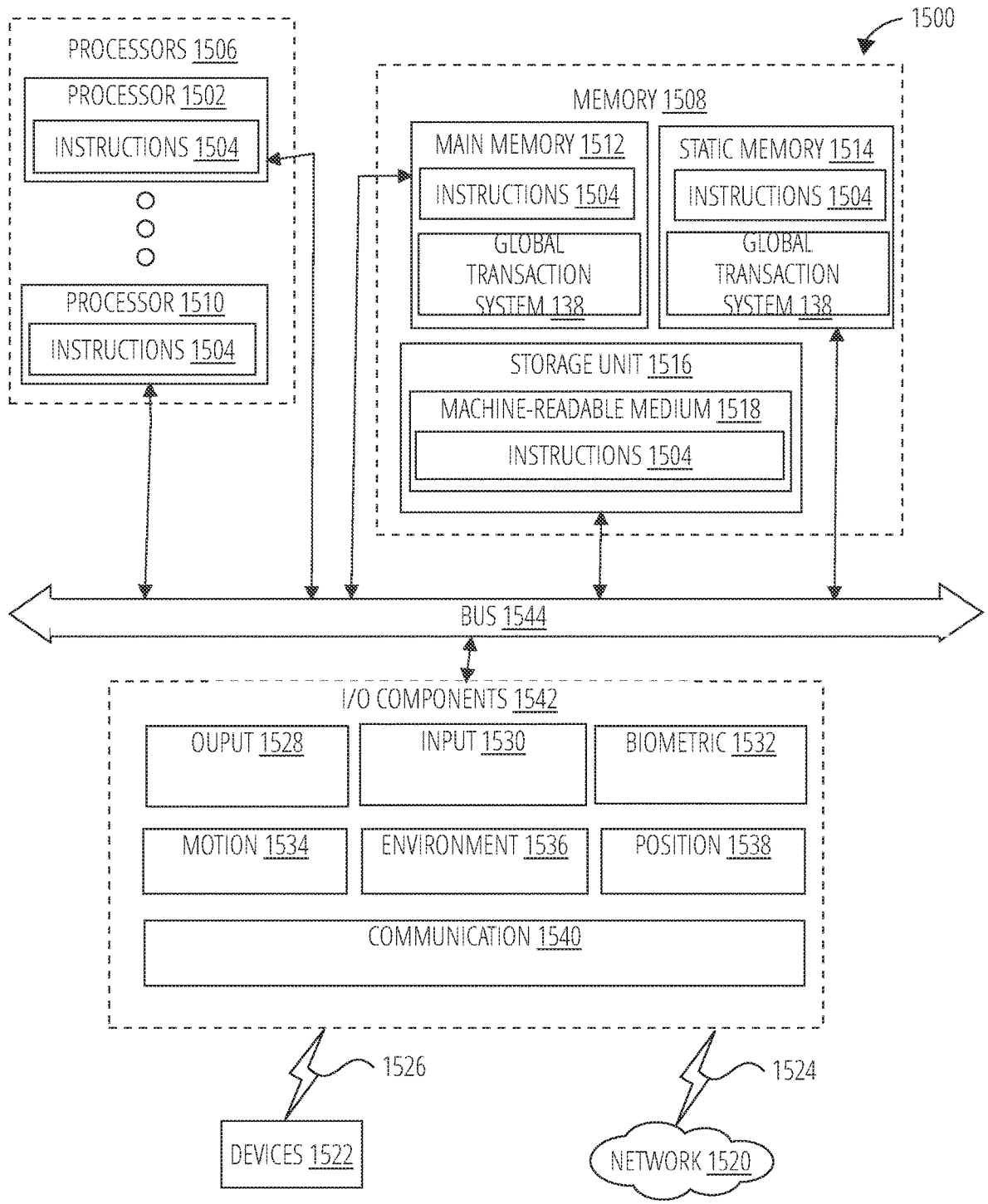
FIG. 15 is a diagrammatic representation of a machine in the form of a computer system within which a set of instructions may be executed for causing the machine to perform any one or more of the methodologies discussed herein, according to an example embodiment.

FIG. 15 is a diagrammatic representation of the machine 1500 within which instructions 1504 (e.g., software, a program, an application, an applet, an app, or other executable code) for causing the machine 1500 to perform any one or more of the methodologies discussed herein may be executed. For example, the instructions 1504 may cause the machine 1500 to execute any one or more of the methods described herein. The instructions 1504 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1504, sequentially or otherwise, that specify actions to be taken by the machine 1500. Further, while only a single machine 1500 is illustrated, the term "machine" shall also be taken to include a collection of machines that individually or jointly execute the instructions 1504 to perform any one or more of the methodologies discussed herein.

The machine 1500 may include processors 1506, memory 1508, and I/O components 1542, which may be configured to communicate with each other via a bus 1544. In an example embodiment, the processors 1506 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1502 and a processor 1510 that execute the instructions 1504. The term "processor" is intended to include multi-core processors that may comprise two or more independent processors (sometimes referred to as "cores") that may execute instructions contemporaneously. Although FIG. 15 shows multiple processors 1506, the machine 1500 may include a single processor with a single core, a single processor with multiple cores (e.g., a multi-core processor), multiple processors with a single core, multiple processors with multiples cores, or any combination thereof.

The memory 1508 includes a main memory 1512, a static memory 1514, and a storage unit 1516, both accessible to the processors 1506 via the bus 1544. The main memory 1508, the static memory 1514, and storage unit 1516 store the instructions 1504 embodying any one or more of the methodologies or functions described herein. The instructions 1504 may also reside, completely or partially, within the main memory 1512, within the static memory 1514, within machine-readable medium 1518 within the storage unit 1516, within at least one of the processors 1506 (e.g., within the processor's cache memory), or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (e.g., memory 1508, main memory 1512, static memory 1514, and/or memory of the processors 1506) and/or storage unit 1516 may store one or more sets of instructions and data structures (e.g., software) embodying or used by any one or more of the methodologies or functions described herein. These instructions (e.g., the instructions 1504), when executed by processors 1506, cause various operations to implement the disclosed embodiments.

The instructions 1504 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1504 may be transmitted or received using a transmission medium via the coupling 1526 (e.g., a peer-to-peer coupling) to the devices 1522.

The present application describes a system that supports distributed transactions across microservices involving multiple underlying databases in a scalable setting. The system employs logical transaction commit logs and leverages deterministic underlying database engines for performance and scalability. For coordination across databases, a mechanism similar to 2PC is used in principle but only applies at logical commit level. After a transaction is committed logically, they are materialized by the deterministic databases, which are typically scale-out deployment. The logical commit logs are replicated and can replace physical log-based replication.

The key for the scalability and performance is the techniques to avoid coordination during execution phase as well as transaction materialization (physical commit) that are of relatively longer duration. The coordination is at the commit time for conflict resolution that is of short-duration and fast. 2PC-like protocol is only used for cross database transactions, and unlike traditional 2PC where the involved databases typically need to lock the relevant data records during the protocol playout, the present system does not require locking during the protocol. In addition, this protocol is only needed when a transaction truly impacts multiple databases, and single-database transactions only need to go to its local database transaction manager. Deterministic DB simplifies concurrency control and speed up commit process. The present system is applicable for using deterministic database engines, which require known (r-set, w-set) to perform deterministic transaction scheduling.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a computer-implemented method. The method comprises: receiving a transaction request for a plurality of database services of microservices; receiving a plurality of local commit decisions of local commit requests from local transaction managers of the plurality of database services of the microservices, the local commit request corresponding to the transaction request for each database service; and generating a physical commit request to each of the local transaction managers based on the local commit decisions and a global commit decision, each of the local transaction manager being configured to submit the physical commit request to each database server of the database services corresponding to the transaction request.

In example 2, the subject matter of example 1 can optionally include: receiving the transaction request from an application; generating a transaction identifier for the transaction request, the transaction identifier identifying the database service of the microservice associated with the transaction request; and providing the transaction identifier to the application, the application configured to invoke the local commit request to the database service of the microservice using the transaction identifier.

In example 3, the subject matter of example 1 can optionally include: wherein the transaction request comprises read and write requests to the database server, wherein the receiving of the transaction request is captured during an optimistic execution phase.

In example 4, the subject matter of example 1 can optionally include: confirming a lack of conflict for the transaction request based on a local cache of the local transaction manager and the transaction identifier, the local commit decision indicating the lack of conflict.

In example 5, the subject matter of example 4 can optionally include: wherein the local cache stores logs of committed transactions performed on the database server of the database service.

In example 6, the subject matter of example 1 can optionally include: receiving, from the application, a global commit request that identifies the transaction identifier; receiving, from the database service, a local commit request that identifies the transaction identifier; accessing a local cache of the local transaction manager, the local cache indicating committed transactions; and confirming a lack of conflict for the local commit request based on the local cache and the transaction identifier, the local commit decision indicating the lack of conflict.

In example 7, the subject matter of example 1 can optionally include: receiving a plurality of local commit decisions from a plurality of local transaction managers associated with the transaction request; generating the global commit decision based on the plurality of local commit decisions; and communicating the global commit decision to the plurality of local transaction managers, each local transaction manager configured to submit a physical commit request to a corresponding database server of the corresponding database service based on the global commit decision.

In example 8, the subject matter of example 1 can optionally include: persisting a log of committed transactions for a corresponding local transaction manager; and applying the committed transactions from the log to a database server corresponding to the local transaction manager.

In example 9, the subject matter of example 1 can optionally include: performing a conflict check based on a comparison the local commit request with a local cache of the local transaction manager without accessing the database server, the local cache identifying recent transaction updates to the database server, wherein the local transaction manager is configured to submit the physical commit request to the database server without locking the database server pending the transaction request, wherein the global commit decision is based on a plurality of local commit decisions from a plurality of local transaction managers of database services for the transaction request.

In example 10, the subject matter of example 1 can optionally include: receiving the transaction request from an application; generating a transaction identifier for the transaction request, the transaction identifier identifying a first database service of a first microservice associated with the transaction request and a second database service of a second microservice associated with the transaction request; receiving, from the first database service, a first local commit request at a first local transaction manager corresponding to the first database service, the first local commit request comprising the transaction identifier; receiving, from the second database service, a second local commit request at a second local transaction manager corresponding to the second database service, the second local commit request comprising the transaction identifier; confirming a first lack of conflict for the first local commit request from the first local transaction manager; confirming a second lack of conflict for the second local commit request from the second local transaction manager; and receiving a first local commit decision from the first local transaction manager based on the first lack of conflict; receiving a second local commit decision from the second local transaction manager based on the second lack of conflict; providing the global commit decision to the first local transaction manager and the second local transaction manager in response to receiving the first local commit decision and the second local commit decision; generating a first physical commit request to a first database server of the first database service, in response to the global commit decision; and generating a second physical commit request to a second database server of the second database service, in response to the global commit decision.

What is claimed is:

1. A computer-implemented method comprising:
   receiving a transaction request of a transaction for a plurality of database services of microservices, the plurality of database services of the microservices each including a local transaction manager;
   receiving a local commit decision of a local commit request from each local transaction manager of the plurality of database services of the microservices, the local commit requests corresponding to the transaction request for each database service of the plurality of database services and being processed by each local transaction manager to generate the local commit decision for each database service of the plurality of database services, each respective local transaction manager:
   persisting a log of logically committed transactions that involve a database service managed by the respective local transaction manager in a local cache in an order of transaction logical commit; and
   processing a respective local commit request by performing conflict checking, using an optimistic concurrency control protocol, on the log of logically committed transactions persisted in the local cache of the respective local transaction manager;
   generating a physical commit request to each of the local transaction managers based on the local commit decisions and a global commit decision, the global commit decision being generated based on the local commit decisions; and
   submitting, by each of the local transaction managers, the physical commit request to respective database servers of respective database services corresponding to the transaction request by deterministically applying the logically committed transactions from respective logs to the respective database servers in the order of the respective logs.

2. The computer-implemented method of claim 1, further comprising:
   receiving the transaction request from an application;
   generating a transaction identifier for the transaction request, the transaction identifier identifying one of the database services of the microservices associated with the transaction request; and
   providing the transaction identifier to the application, the application configured to invoke the local commit request to the one database service of the microservice using the transaction identifier.

3. The computer-implemented method of claim 1, wherein the transaction request comprises read and write requests to the database server, wherein the receiving of the transaction request is captured during an optimistic execution phase.

4. The computer-implemented method of claim 1, wherein the local commit decision received from a respective local transaction manager indicates a lack of conflict for the logically committed transactions in the log persisted in the local cache of the respective local transaction manager.

5. The computer-implemented method of claim 2, further comprising:
receiving, from the application, a global commit request that identifies the transaction identifier;
receiving, from the one database service, a local commit request that identifies the transaction identifier;
accessing the local cache of the local transaction manager of the one database service; and
confirming a lack of conflict for the local commit request based on only the log of logically committed transactions stored in the local cache of the local transaction manager of the one database service.

6. The computer-implemented method of claim 1, further comprising:
receiving a plurality of local commit decisions from a plurality of local transaction managers associated with the transaction request;
generating the global commit decision based on the plurality of local commit decisions; and
communicating the global commit decision to the plurality of local transaction managers, each local transaction manager being configured to submit the physical commit request to a corresponding database server of a corresponding database service based on the global commit decision.

7. The computer-implemented method of claim 1, further comprising:
performing a conflict check based on a comparison of the local commit request to the local cache of a respective local transaction manager without accessing the database server of the respective local transaction manager,
wherein the respective local transaction manager is configured to submit the physical commit request to the database server of the respective local transaction manager without locking the database server pending the transaction request, and
wherein the global commit decision is based on a plurality of local commit decisions from a plurality of local transaction managers of database services for the transaction request.

8. The computer-implemented method of claim 1, further comprising:
receiving the transaction request from an application;
generating a transaction identifier for the transaction request, the transaction identifier identifying a first database service of a first microservice associated with the transaction request and a second database service of a second microservice associated with the transaction request;
receiving, from the first database service, a first local commit request at a first local transaction manager corresponding to the first database service, the first local commit request comprising the transaction identifier;
receiving, from the second database service, a second local commit request at a second local transaction manager corresponding to the second database service, the second local commit request comprising the transaction identifier;
confirming a first lack of conflict for the first local commit request on only the log of logically committed transactions stored in the local cache of the first local transaction manager;
confirming a second lack of conflict for the second local commit request on only the log of logically committed transactions stored in the local cache of the second local transaction manager;
receiving a first local commit decision from the first local transaction manager based on the first lack of conflict;
receiving a second local commit decision from the second local transaction manager based on the second lack of conflict;
providing the global commit decision to the first local transaction manager and the second local transaction manager in response to receiving the first local commit decision and the second local commit decision;
generating a first physical commit request to a first database server of the first database service, in response to the global commit decision; and
generating a second physical commit request to a second database server of the second database service, in response to the global commit decision.

9. The computer-implemented method of claim 1, further comprising:
transmitting, by a respective local transaction manager, the local commit decision to a global transaction manager responsive to determining that the transaction request involves more than one database service; and
logically committing, by the respective local transaction manager, the transaction request in the local cache of the respective local transaction manager in response to receiving, from the global transaction manager, the global commit decision generated based on the local commit decisions.

10. The computer-implemented method of claim 9, further comprising:
logically committing, by the respective local transaction manager, the transaction request in the local cache of the respective local transaction manager without transmitting the local commit decision to the global transaction manager and without receiving the global commit decision from the global transaction manager responsive to determining that the transaction request only involves one database service.

11. The computer-implemented method of claim 1, further comprising materializing the transaction request, the transaction request materialized concurrently by each database server of the database services corresponding to the transaction request in response to the physical commit request being submitted.

12. The computer-implemented method of claim 1, wherein performing the conflict checking by the respective local transaction manager includes checking only the logically committed transactions in the log persisted by the respective local transaction manager, the log of logically committed transactions of the respective local transaction manager excluding the logically committed transaction that involve other database services and do not involve the database service managed by the respective local transaction manager.

13. The computer-implemented method of claim 1, further comprising:
identifying, by each respective local transaction manager, an additional transaction in the log having a read set that includes a first read that is being applied to the database service, the first read being applied to the database service before other reads in the read set; and
purging, by each respective local transaction manager, the logically committed transactions from the local cache of the respective local transaction manager that are cached before the first read.

14. The computer-implemented method of claim 13, wherein logically committed transactions that have been purged logs are excluded from the conflict checking performed by each respective local transaction manager.

15. A computing device, the computing device comprising:
a processor; and
a memory storing instructions that, when executed by the processor, configure the computing device to:
receive a transaction request of a transaction for a plurality of database services of microservices, the plurality of database services of the microservices each including a local transaction manager;
receive a local commit decision of a local commit request from each local transaction manager of the plurality of database services of the microservices, the local commit requests corresponding to the transaction request for each database service of the plurality of database services and being processed by each local transaction manager to generate the local commit decision for each database service of the plurality of database services, each respective local transaction manager:
persisting a log of logically committed transactions that involve a database service managed by the respective local transaction manager in a local cache in an order of transaction logical commit; and
processing a respective local commit request by performing conflict checking, using an optimistic concurrency control protocol, on the log of logically committed transactions persisted in the local cache of the respective local transaction manager;
generate a physical commit request to each of the local transaction managers based on the local commit decisions and a global commit decision, the global commit decision being generated based on the local commit decisions, each of the local transaction managers being configured to submit the physical commit request to respective database servers of respective database services corresponding to the transaction request by deterministically applying the logically committed transactions from respective logs to the respective database servers in the order of the respective logs.

16. The computing device of claim 15, wherein the instructions further configure the computing device to:
receive the transaction request from an application;
generate a transaction identifier for the transaction request, the transaction identifier identifying one of the database services of the microservices associated with the transaction request; and
provide the transaction identifier to the application, the application configured to invoke the local commit request to the one database service of the microservice using the transaction identifier.

17. The computing device of claim 16, wherein the instructions further configure the computing device to:
receive, from the application, a global commit request that identifies the transaction identifier;
receive, from the one database service, a local commit request that identifies the transaction identifier;
access the local cache of the local transaction manager of the one database service; and
confirm a lack of conflict for the local commit request on only the log of logically committed transactions stored in the local cache of the local transaction manager of the one database service.

18. The computing device of claim 15, wherein the instructions further configure the computing device to:
receive a plurality of local commit decisions from a plurality of local transaction managers associated with the transaction request;
generate the global commit decision based on the plurality of local commit decisions; and
communicate the global commit decision to the plurality of local transaction managers, each local transaction manager being configured to submit the physical commit request to a corresponding database server of a corresponding database service based on the global commit decision.

19. The computing device of claim 15, wherein the instructions further configure the computing device to:
perform a conflict check based on a comparison of the local commit request to the local cache of a respective local transaction manager without accessing the database server of the respective local transaction manager,
wherein the respective local transaction manager is configured to submit the physical commit request to the database server of the respective local transaction manager without locking the database server pending the transaction request,
wherein the global commit decision is based on a plurality of local commit decisions from a plurality of local transaction managers of database services for the transaction request.

20. A non-transitory machine-readable storage medium including instructions that when executed by a computer, cause the computer to:
receive a transaction request of a transaction for a plurality of database services of microservices, the plurality of database services of the microservices each including a local transaction manager;
receive a local commit decision of a local commit request from each local transaction manager of the plurality of database services of the microservices, the local commit requests corresponding to the transaction request for each database service of the plurality of database services and being processed by each local transaction manager to generate the local commit decision for each database service of the plurality of database services, each respective local transaction manager:
persisting a log of logically committed transactions that involve a database service managed by the respective local transaction manager in a local cache in an order of transaction logical commit; and
processing a respective local commit request by performing conflict checking, using an optimistic concurrency control protocol, on the log of logically committed transactions stored in the local cache of the respective local transaction manager;
generate a physical commit request to each of the local transaction managers based on the local commit decisions and a global commit decision, the global commit decision being generated based on the local commit decisions; and submit, by each of the local transaction managers, the physical commit request to respective database servers of respective database services corresponding to the transaction request by deterministically applying the logically committed transactions from respective logs to the respective database servers in the order of the respective logs.

* * * * *